Jan. 20, 1931.  C. R. DOWNS  1,789,809
TEMPERATURE CONTROL IN CHEMICAL REACTIONS
Original Filed June 11, 1919
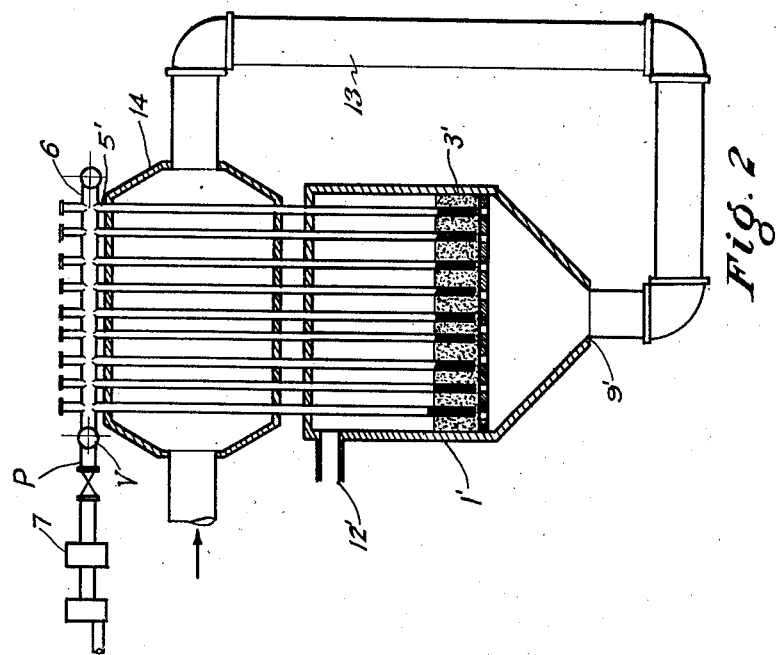
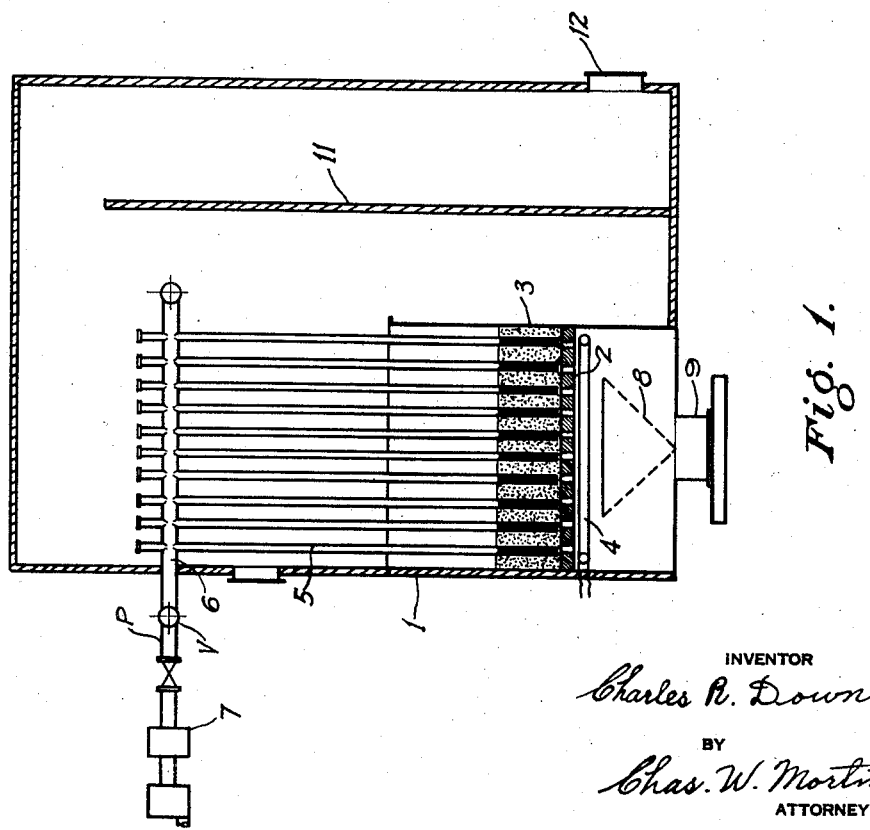
INVENTOR
Charles R. Downs
BY
Chas. W. Mortimer
ATTORNEY Patented Jan. 20, 1931

1,789,809

UNITED STATES PATENT OFFICE

CHARLES R. DOWNS, OF CLIFFSIDE, NEW JERSEY, ASSIGNOR TO THE BARRETT COMPANY, A CORPORATION OF NEW JERSEY

TEMPERATURE CONTROL IN CHEMICAL REACTIONS

Application filed June 11, 1919. Serial No. 303,337.

This invention is for a process and apparatus for controlling temperatures in chemical reactions. The invention may be used to control the temperatures in chemical reactions in the liquid or vapor phase with or without a catalyzer, but is especially applicable to exothermic reactions carried on in the vapor phase in the presence of a catalyzer.

By this invention use is made of the principle that vaporizable liquids will absorb latent heat in changing from the liquid to the vapor state without change in temperature, the heat being carried away by the vapors from which it may be extracted, thereby condensing the vapors which may be returned for absorbing more heat.

The invention will be described and illustrated in connection with apparatus in which a gaseous reaction mixture is brought into contact with a catalyst in which or in proximity to which there are containers for a vaporizable liquid or liquids, said containers being provided with means for leading off vapors to a cooling space and returning the condensed liquid. There may be one or more containers for the liquid and they should be so shaped and disposed that heat will be readily transmitted from the catalyst to the vaporizable liquid. It is to be understood that the invention is not restricted to the particular apparatus shown, nor to the materials mentioned.

In the drawings

Fig. 1 is a section through a form of apparatus for carrying out the process, and Fig. 2 is a section through a modified form of the apparatus.

In Fig. 1 the reference character 1 refers to a container which is provided with a perforated plate 2 upon which a layer of catalyst 3 or carrier such as pumice or asbestos for said catalyst, is placed. Electrical heating means are shown at 4 and a series of pipes 5 with closed ends extend into the catalyst 3 or the carrier for the same. The upper ends of the pipes 5 terminate in a header 6 which may be connected to a pump 7 which may be used either to create a vacuum or pressure in the pipes or to introduce a gas, preferably neutral, into the header from a source, not shown. A valve V in the pipe P may be closed, if desired, after the pump 7 has been operated to obtain the desired condition in the system. The lower ends of the pipes 5 are filled with a liquid which may be vaporized and then be condensed in the upper end of the tubes 5 or in the header 6 and run back into the lower ends. A deflector 8 is shown in the lower part of the container 1 which has an inlet 9 and the container 1 is surrounded by a casing or housing 10 having a partition 11 and an outlet 12.

In the modification shown in Fig. 2, the container $1^1$ is provided with an outlet $12^1$, and a pipe 13 leads to the inlet $9^1$ from the jacket 14 which surrounds the upper portion of the tubes $5^1$. The other parts shown in Fig. 2 are similar to the corresponding parts described in connection with Fig. 1.

The operation according to Fig. 1 is as follows: The reaction mixture is introduced through inlet 9 into container 1 where it comes into contact with the catalyst 3. If necessary, the heater 4 may first bring the temperature up to that required to initiate the catalytic reaction which is supposed to be an exothermic one. The catalyst 3 becomes heated and the heat is conducted through the walls of the tubes 5 to the liquid therein which is caused to boil and the vapors rise in the tubes 5, the upper end of which are cooled in any convenient way so that the vapors become condensed and trickle back into the lower ends of the tubes 5. The liquid in the tubes is not heated above its boiling point because an increase in the heat transmitted to the same merely causes an increase in the ebullition without a rise in temperature. The pressure in the system may be varied by means of the pump 7 thereby varying the temperature at which the liquid will boil. After the reaction mixture has passed through the catalytic zone, the products of reaction pass upward around the wall 11 and out of the outlet 12, so that the products may be collected and used. The operation according to Fig. 2 is the same as that above described in connection with Fig. 1 except that the reaction mixture is passed through jacket 14 so as to come into contact with the tubes 5 and become heated before it is passed into contact with the catalyst 3¹. The products of reaction pass out through the outlet 12¹.

A specific application of this invention is in the oxidation of naphthalene to phthalic acid in the presence of vanadium oxide as a catalyzer. It has been found that the proper temperature at which this reaction should be carried out is about 375° C. because very much higher temperatures cause the oxidation to progress too far, and the reaction will not take place satisfactorily at very much lower temperatures. Mercury boils at 357° C. so that if a mixture of an oxygen containing gas and naphthalene in the vapor phase is passed into the catalyst the exothermic reaction to produce phthalic acid will raise the temperature enough to provide sufficient temperature gradient or head between the catalyst 3 and the liquid in tubes 5 when this liquid is mercury so that the exothermic heat is transmitted from the catalyst to the mercury with sufficient rapidity to keep the temperature of the catalyst at about the proper amount, or near 375° C. The temperature will be automatically regulated to a certain extent, for when more heat is evolved the mercury will boil more rapidly and thereby remove heat more rapidly. The cooling surfaces of the pipes 5 will be made large enough to assure condensing of all the vapors, and the pressure maintained in the pipes will be such as to keep the boiling point of the liquid mercury so that it will hold the catalyst at the proper temperature. When mercury or other oxidizable liquid is used as the heat removing agency it may be advisable to introduce into the tubes 5 a neutral gas, such as nitrogen, to prevent oxidation of the liquid.

It is obvious that the principle of this invention may be applied in different ways without departing from the spirit and scope of the invention, and the temperature may be controlled in many other chemical reactions by using other liquids of different boiling points or the boiling points of the liquids used can be controlled within somewhat wide limits by changing the pressure inside the tubes 5. Two or more streams of liquids or gases, or a mixture of the same with solid materials, which react exothermically when brought into contact may have their temperatures controlled during the reaction as herein described. Further examples of chemical reaction to which this invention is applicable are the oxidation of anthracene to anthraquinone, toluene to benzoic acid and benzaldehyde, benzene to maleic acid, ethyl alcohol to acetaldehyde, and the chlorination of hydrocarbons, etc. Other applications of this invention not necessary to describe will readily occur to those skilled in the art.

What is claimed and desired to be secured by Letters Patent is:

1. In the art of exothermic gas phase chemical reactions in the presence of a catalyst the improvement which comprises maintaining a substantially constant and uniform temperature by the vaporization of mercury distributed within the zone of reaction out of direct contact with the catalyst but in heat transferring relationship thereto.

2. In the art of gas phase partial oxidation of organic compounds in the presence of a catalyst the improvement which comprises maintaining a substantially constant and uniform temperature by the vaporization of a liquid distributed within the zone of reaction out of direct contact with the catalyst but in heat transferring relationship thereto.

3. In the art of gas phase partial oxidation of organic compounds in the presence of a catalyst the improvement which comprises maintaining a substantially constant and uniform temperature by the vaporization of mercury distributed within the zone of reaction out of direct contact with the catalyst but in heat transferring relationship thereto.

4. In the art of gas phase partial oxidation of hydrocarbons in the presence of a catalyst the improvement which comprises maintaining a substantially constant and uniform temperature by the vaporization of a liquid distributed within the zone of reaction out of direct contact with the catalyst but in heat transferring relationship thereto.

5. In the art of gas phase oxidation of naphthalene in the presence of a catalyst to form phthalic anhydride the improvement which comprises maintaining a substantially constant and uniform temperature by the vaporization of mercury distributed within the zone of reaction out of direct contact with the catalyst but in heat transferring relationship thereto.

6. The herein described process which comprises bringing an oxygen containing gas and naphthalene in the vapor phase into contact with vanadium oxide as a catalyst at such a temperature that chemical reaction will take place, and maintaining the temperature of said catalyst near the boiling point of mercury by providing liquid mercury in close proximity to the catalyst so that heat may be readily transmitted to the mercury and vaporize the same.

7. The herein described process which comprises bringing an oxygen containing gas and naphthalene in the vapor phase into contact with vanadium oxide as a catalyst at such a temperature that chemical reaction will take place, and maintaining the temperature near the boiling point of mercury by providing liquid mercury in close proximity to the catalyst so that heat may be readily transmitted to the mercury and vaporize the same, condensing the vapors and returning the liquid mercury to its original position.

8. In the manufacture of phthalic acid by the partial oxidation of naphthalene by an oxygen containing gas in the presence of a suitable catalyzer, the step which comprises providing liquid mercury out of contact with the reaction mixture but in heat transferring relationship thereto.

9. In the manufacture of phthalic acid by the partial oxidation of naphthalene by an oxygen containing gas in the presence of a suitable catalyst, the steps which comprise supplying liquid mercury to the zone of reaction out of contact with the reaction mixture but in heat transferring relationship to said catalyst so that heat will be absorbed by said mercury as latent heat of vaporization and maintaining the supply of liquid mercury in the reaction zone by introducing liquid mercury before all of the original mercury has been vaporized.

10. In the manufacture of phthalic acid by the partial oxidation of naphthalene by an oxygen containing gas in the presence of a suitable catalyst, the step which comprises maintaining liquid mercury out of contact with the reaction mixture but in heat transferring relationship to said catalyst so that heat will be absorbed as latent heat of vaporization to keep the temperature of the catalyst at about 375° C.

11. The herein described process which comprises bringing an oxygen containing gas mixed with the vapor of naphthalene into contact with a catalyst whereby an exothermic reaction takes place to form phthalic acid, and maintaining the temperature of the catalyst substantially constant and uniform at a predetermined degree by the latent heat of vaporization of mercury, which mercury and its vapor is maintained out of direct intermixture with the catalyst or the reaction materials, but in heat transferring relationship thereto.

12. The process of the oxidation of hydrocarbons, which consists in creating a heated reaction zone containing a catalyst, vaporizing the hydrocarbons, passing the heated hydrocarbon vapors commingled with an oxygen containing gas through the reaction zone and in the presence of the catalyst therein, and modifying the temperature of the reacting vapors by subjecting said vapors to the cooling influence of the vaporizing action of a liquid vaporized by the heat of the reaction and that will vaporize at a temperature below that caused by the catalytic reaction.

13. In the art of gas phase catalytic chemical reactions which are sufficiently exothermic to be self-sustaining, the improvement which comprises maintaining a substantially constant and uniform temperature by the vaporization of a liquid distributed within the zone of reaction out of direct contact with the catalyst but in heat transferring relationship thereto.

14. In carrying out gas phase chemical reactions in the presence of a catalyst wherein sufficient heat to maintain the reaction is generated by the reaction itself, the improvement which comprises removing the thus generated heat at a substantially constant and uniform temperature by the vaporization of a liquid distributed within the zone of reaction out of direct contact with the catalyst but in heat transferring relationship thereto.

15. In carrying out gas phase chemical reactions in the presence of a catalyst wherein sufficient heat to maintain the reaction is generated by the reaction itself, the improvement which comprises removing the thus generated heat at a substantially constant and uniform temperature by the vaporization of a substance that is liquid at the temperature of the reaction, said liquid being distributed within the zone of the reaction out of direct contact with the catalyst but in heat transferring relationship thereto.

16. In the gas phase partial oxidation of naphthalene to phthalic anhydride by an oxygen containing gas in the presence of a suitable catalyst, the step which comprises maintaining a liquid out of contact with the reaction mixture but in such close heat transferring relationship to said catalyst that heat will be absorbed as latent heat of vaporization of said liquid to keep the temperature of the catalyst below that which will cause complete combustion and cessation of the formation of phthalic anhydride.

17. In the art of gas phase catalytic chemical reactions which are sufficiently exothermic to be self-sustaining, the improvement which comprises maintaining a substantially constant and uniform temperature by the vaporization of a liquid distributed within the zone of the reaction out of direct contact with the catalyst but in heat transferring relationship thereto, and varying the boiling point of said liquid in order to vary the temperature of the catalyst.

18. In the gas phase partial oxidation of naphthalene to phthalic anhydride by an oxygen containing gas in the presence of a suitable catalyst, the step which comprises maintaining a liquid out of contact with the reaction mixture but in such close heat transferring relationship to said catalyst that heat will be absorbed as latent heat of vaporization of said liquid to keep the temperature of the catalyst below that which will cause complete combustion and cessation of the formation of phthalic anhydride, and varying the temperature of the catalyst by varying the boiling point of said liquid.

19. The process of treating reacting gases which consists in producing a current of gases, subjecting said gases at one point to the presence of a catalyst, removing excess heat thereby generated by a liquid that will boil at the temperature generated and subjecting the incoming cooler gases to the heat absorbed by the boiling liquids.

20. The process of treating reacting gases which consists in producing a current of gases, subjecting said gases at one point to the presence of a catalyst, removing excess heat thereby generated by a liquid that will boil at the temperature generated and subjecting the incoming cooler gases to the heat absorbed by the boiling liquid and returning the liquid back to its original point of application.

21. The process of treating reacting gases which consists in producing a current of gases, subjecting said gases at one point to the presence of a catalyst, removing excess heat thereby generated, subjecting the catalyst to the cooling influence of a liquid that will boil at the temperature generated by the catalytic action, and subjecting the incoming cooler gases to the heating influence of the vapors generated by the boiling of said liquid.

22. The process of treating reacting gases which consists in producing a current of gases, subjecting said gases at one point to the presence of a catalyst, removing excess heat thereby generated by subjecting the catalyst to the cooling influence of a liquid that will boil at the temperature generated by the catalytic action, and subjecting the incoming cooler gases to the influence of the vapors generated by the boiling of said liquid, liquifying the vapors and returning the liquid again to the sphere of the catalytic action.

23. The method of regulating high temperature vapor phase exothermic catalytic reactions, which comprises passing the reacting gases or vapors through the catalyst at the reaction temperature, maintaining a two-phase liquid-vapor temperature-regulating system with its liquid phase in intimate heat interchanging relation with the catalyst, whereby the heat of reaction is absorbed by the heating and vaporization of said liquid at its boiling point, and circulating the reacting gases or vapors in heat interchanging relation with the vapor phase of said system before their passage through the catalyst, thereby preheating the reaction mixture and cooling the vapors in said system.

24. The process which comprises heating a liquid to about its boiling point and passing reacting gases through a catalyst maintained in heat interchanging relation with said liquid, and causing said gases to absorb heat from vapors evolved from said liquid before said gases reach said catalyst.

In testimony whereof I affix my signature.
CHARLES R. DOWNS.